(12) United States Patent
Dondini et al.

(10) Patent No.: US 10,616,333 B2
(45) Date of Patent: Apr. 7, 2020

(54) SYSTEM FOR THE MANAGEMENT OF OUT-OF-ORDER TRAFFIC IN AN INTERCONNECT NETWORK AND CORRESPONDING METHOD AND INTEGRATED CIRCUIT

(71) Applicant: STMicroelectronics S.r.l., Agrate Brianza (IT)

(72) Inventors: Mirko Dondini, Catania (IT); Daniele Mangano, San Gregorio di Catania (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 843 days.

(21) Appl. No.: 14/659,159

(22) Filed: Mar. 16, 2015

(65) Prior Publication Data

US 2015/0296018 A1    Oct. 15, 2015

(30) Foreign Application Priority Data

Apr. 9, 2014 (IT) .............................. TO2014A0307

(51) Int. Cl.
*G06F 12/00* (2006.01)
*G06F 13/00* (2006.01)
(Continued)

(52) U.S. Cl.
CPC ...... *H04L 67/1097* (2013.01); *G06F 13/1626* (2013.01); *G06F 13/4022* (2013.01);
(Continued)

(58) Field of Classification Search
None
See application file for complete search history.

(56) References Cited

U.S. PATENT DOCUMENTS 5,655,097 A * 8/1997 Witt .................... G06F 9/30014
711/147
8,407,433 B2    3/2013 Wingard et al.
(Continued)

FOREIGN PATENT DOCUMENTS

EP            2 444 903 A1    4/2012

*Primary Examiner* — Nicholas R Taylor
*Assistant Examiner* — Ho T Shiu
(74) *Attorney, Agent, or Firm* — Seed Intellectual Property Law Group LLP

(57) ABSTRACT

A system to manage out-of-order traffic in an interconnect network has initiators that provide requests through the interconnect network to memory resource targets and provide responses back through the interconnect network. The system includes components upstream the interconnect network to perform response re-ordering, which include memory to store responses from the interconnect network and a memory map controller to store the responses on a set of logical circular buffers. Each logical circular buffer corresponds to an initiator. The memory map controller computes an offset address for each buffer and stores an offset address of a given request received on a request path. The controller computes an absolute write memory address where responses are written in the memory, the response corresponding to the given request based on the given request offset address. The memory map controller also performs an order-controlled parallel read of the logical circular buffers and routes the data read from the memory to the corresponding initiator.

18 Claims, 12 Drawing Sheets

(51) Int. Cl.
*G06F 9/30* (2018.01)
*G06F 9/318* (2018.01)
*H04L 29/08* (2006.01)
*H04L 12/721* (2013.01)
*G06F 13/40* (2006.01)
*G06F 13/16* (2006.01)

(52) U.S. Cl.
CPC .......... *H04L 45/72* (2013.01); *G06F 13/4059* (2013.01); *G06F 2213/0038* (2013.01)

(56) References Cited

U.S. PATENT DOCUMENTS

| | | | |
|---|---|---|---|
| 2009/0019262 A1* | 1/2009 | Tashiro | G06F 9/3016 712/208 |
| 2009/0089532 A1 | 4/2009 | Wang et al. | |
| 2010/0138630 A1* | 6/2010 | Persson | G06F 9/342 711/214 |
| 2012/0079154 A1* | 3/2012 | Mangano | G06F 13/1626 710/112 |
| 2013/0097401 A1* | 4/2013 | Sarta | G06F 12/0646 711/173 |
| 2013/0159449 A1* | 6/2013 | Taylor | G06F 15/167 709/212 |
| 2013/0262733 A1* | 10/2013 | Boucard | G06F 13/4059 710/309 |

\* cited by examiner

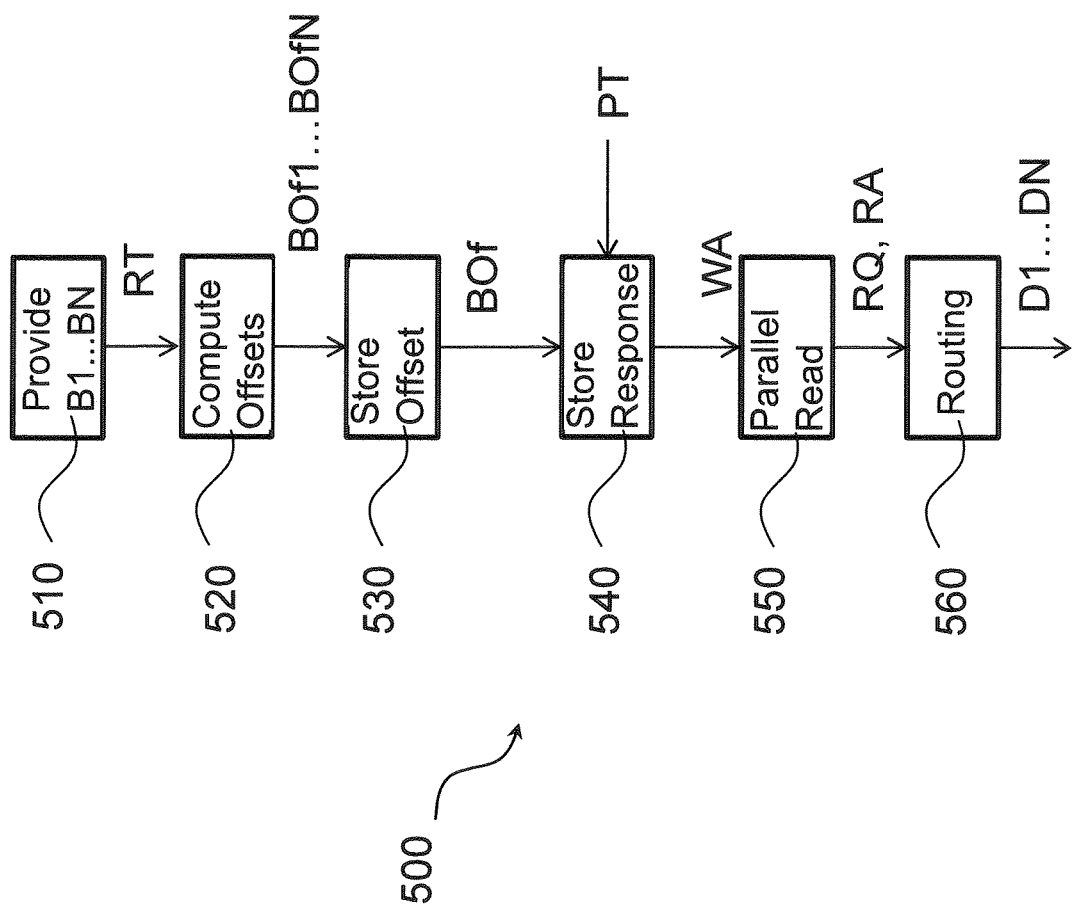

SYSTEM FOR THE MANAGEMENT OF OUT-OF-ORDER TRAFFIC IN AN INTERCONNECT NETWORK AND CORRESPONDING METHOD AND INTEGRATED CIRCUIT

BACKGROUND

Technical Field

The present disclosure relates to techniques for the management of out-of-order traffic in an interconnect network, comprising one or more initiators providing requests through said interconnect network to targets, in particular memory resources, providing responses through said interconnect network back to said one or more initiators, said system comprising one or more components (100, 200) placed upstream the interconnect network, configured for performing response re-ordering.

Embodiments have been developed with particular attention paid to possible use for enabling communication between circuits, in particular System-on-Chip (or SoC) and System-in-Package (or SiP) through Network-On-Chip (NoC) or Network-in-Package (NiP) arrangements.

Description of the Related Art

Systems in an integrated circuit (System-on-Chip or SoC) and system in a sole package (System-in-Package or SiP) typically comprise a plurality of circuits which communicate one with the other through a shared communications channel. For instance such communications channel can be a bus or a communications network, such as a Network-On-Chip (NoC) or Network-in-Package (NiP), often indicated as interconnect network (Interconnection Network or ICN).

For instance such System-on-Chip are often used for processors that are intended for mobile or multimedia applications, such as smartphones, set-top boxes, or routers for home use.

In this context, the number of IP components embedded in state of the art Systems on Chip for mobile, multimedia and in general consumer applications, is continuously growing, and each of them carries new advanced features that work together with increased hardware complexity and bandwidth requirements to support them.

In FIG. 1 it is shown a SoC context in which a plurality of intellectual property circuit blocks, or IPs, 50_1 ... 50_N. In general terms, IPs are here distinguished between initiators (IPs generators of request transactions traffic onto the interconnect network) and targets (IPs generators of response transaction traffic according to received requests). In the following reference will be made to initiators 50_1 ... 50_N, representing initiator IPs generating requests or also hardware pipelines.

Such plurality of initiators 50_1 ... 50_N is connected through an interconnect 70 to memories 20_1 ... 20_M, specifically DDR memories. Indeed, initiators 50 need to interface with memory subsystems such as DDR memories 20, which operates as IP targets, in order to send and retrieve processing data, through the interconnect network 70 that manages the access to this target resources.

In such an application, performance requirements like memory access efficiency, IPs time latency penalties and data bandwidths are system constraints becoming more difficult to match on silicon; this push in the direction of improving overall performance, by removing or reducing system bottlenecks to fully exploit the capability made available by the Initiator IPs—Interconnect—Target IPs chains.

One of the bottlenecks mentioned above is represented by the possibility to have out-of-order among transactions and the hardware solutions implemented to manage it.

The concept of out-of-order traffic within interconnect networks stands for the possibility that the order with response transactions are received by an Initiator is not the same as the order of the correspondent request transactions sent by the Initiator itself over the interconnect network.

Such a situation needs to be managed properly in the system in order to guarantee coherency of write/read operations and memory status from Initiator IPs viewpoint.

Root causes of out-of-order transaction traffic generation can be different, typical are:

Memory Scheduler IPs: these IPs can change the execution order of request transactions in order to improve DDR memories efficiency, by reducing bank, page accesses latency penalties. They are typically placed in front of DDR Memory Controllers, cascaded to the interconnect network;

Targets Latencies: having Initiators able to access several Targets through pipelined request transactions, different latencies among Targets can produce overtakes among response transactions: for example, Target IP2 accessed after Target IP1, by the same Initiator, could be able to provide responses faster thanks to smaller cycle latency, thus inverting the request order on response, as seen by the Initiator;

Interconnect Networks: state of the art on-chip interconnect networks make available advanced features for memory abstraction, hiding details on its physical organization (for example, single logical target memory mapped onto different physical memory cuts): this could lead to the generation of out-of-order responses, not expected by the Initiator IP that does not know the details of the memory organization;

Interconnect Protocol Interoperability: modern Systems on Chip integrate IPs from external providers or in-house built, often supporting different interconnect protocols, and the adaptation of them could lead to the generation of order violations.

Types of out-of-order transaction traffic can be categorized as follows:

Response Interleaving: Order of response transactions start is the same of request transactions but the atomic elements of each response (i.e., AXI beats, ST-STBus packets) can be interleaved with other atomic elements belonging to other responses; Response Interleaving breaks the atomicity of response transactions;

ID-based Order: Response transactions with the same process identifier (i.e., AXI ID interface signal, ST-STBus SRC interface signal) are guaranteed to respect the same order of request transactions (intra-id order) but response transactions with different process identifiers can be propagated with different order (inter-id out-of-order).

This is the order policy allowed by full AXI-based interconnect systems

Full Out-of-Order: Response transactions can be sent back to Initiators IPs in any order, apart from violating basic interconnect protocol rules (AXI: beats of a burst are preferably sent back in order; ST-STBus cells of a packet are preferably sent back in order and not interleaved).

Different solutions have been put in place with the goal of managing data coherency for Initiator IPs performing accesses and receiving such responses; the main ones belong to these categories:

Request Filtering: Interconnect networks foresee components to block request propagation when a potential risk of out-of-order response generation is detected (i.e., an Initiator IP is pipelining two accesses to different Target IPs); this technique avoids upstream out-of-order generation by construction, but does not cover those cases where the out-of-order is generated downstream the interconnect network. It has also strong implications on system performances, because the blocking of request path could lead to interconnect network under-utilization;

Target Re-ordering: Target IPs having the capability of changing request transactions order (as the aforementioned Memory Schedulers) typically foresee ad-hoc components to properly re-order response and achieve coherency with received request traffic on input. This technique solves the out-of-order generation downstream the interconnect networks and typically is combined with the Request Filtering one to provide a solution at SoC level; the drawback in this case is that the order imposed to the Memory Scheduler responses can lead to a back-pressure onto Memory Scheduler requests, causing inefficiencies in the system global performances;

Initiator Re-ordering: Specific components upstream the interconnect network or directly embedded with Initiator IPs are responsible for response re-ordering, leaving the other parts of the system free to generate traffic without constraints. Each of these components is associated to an Initiator IP and is sized accordingly to the bandwidth requirement of that IP. This technique achieves better performance with respect to the previous at the cost of increasing the IP request to response roundtrip latency (cycle latency on the path Initiator—Interconnect—Target—Interconnect—Initiator).

With the growing applications performance demand, current SoC face the need to maximize the efficiency of all components in the chain (IPs, Interconnect Network, Memories) and one of the areas where it is recognized benefits are not negligible is the Interconnect Networks utilization. In this context, allowing out-of-order traffic propagation both on request and response side is an improved architectural solution to improve efficiency of network utilization, with positive impacts on overall round-trip latency timing and bandwidth requirements matching. This implies request traffic propagation as free as possible (no filtering mechanisms) and avoidance of traffic re-ordering at target side (causing drawbacks on request side). Therefore, the only aforementioned strategy that meets the requirement is the re-ordering performed at Initiator IP side.

A known solution using Initiator side re-ordering uses a Transactions Reordering Unit, as disclosed for instance in the European Patent EP 2 444 903 A1. Such solution represents a feasible implementation for full re-ordering at Initiator side in terms of cost (area reduction) and timing (faster performance), thanks to its index-based approach for information recovery from internal control memory (Tracking Memory), that removes the need of performing heavy search processes on response side. This is convenient with respect to Content Addressable Memory (CAM) or Linked List based Tracking Memories that are slower, due to search processes required to explore CAM or Linked List for information recovery, and more area demanding, due to the need of store the search keyword.

In FIGS. 2a and 2b it is shown schematically such prior art solution in a multi-process and single client use case.

In FIG. 2a it is shown a single client case in which an initiator 50 communicates with an interconnect 70 through an ordering module 100, which is in particular a TRU (Transaction Reordering Unit), which achieves the ordering, taking as input out of order traffic OOT from the interconnect 70 and outputting in order traffic IOT to the initiator 50. Applied to the multi-process and single client use case of FIG. 2a, the TRU solution allows to convert a full out-of-order response traffic coming from the interconnect network into a full in-order traffic to the initiator IP, while the conversion from full out-of-order to ID-based order is not supported.

In FIG. 2b it is shown a multi-client case in which a plurality of TRU modules 100a, 100b, 100c takes as input out of order traffic OOT from the interconnect 70 and exchanges with a plurality of respective initiators, 50_1, 502 ... 50_N intra-client in order traffic INIT and inter client out of order traffic ICOT. Thus, client based re-ordering at Initiator side requires the instantiation of a TRU component (100_1 ... 10_N) for each client (initiators 50_1 ... 50_N or hardware pipeline) to achieve order independency among clients. This means duplication of request tracking memory and response re-ordering memory for each client, with very poor hardware utilization, because only one TRU module at a time can work, due to serialization imposed by the common Interconnect port the clients are sharing. This makes multi-client re-ordering at initiator side too expensive in terms of area occupation and not practical with TRU components.

Other solutions are known, for example placing a shared TRU component downstream the traffic channels multiplexer, in front of interconnect network. This reduces the area occupation and improves the hardware utilization but forces full in-order traffic, also among clients, making it not practical for performance reasons.

BRIEF SUMMARY

Embodiments provide a communication system that solves the drawbacks of the prior art and in particular allows:
performing transactions re-ordering at the initiator IP response side, by managing response transactions to rebuild same order of request ones, to achieve coherency of Read/Write accesses performed by the initiator IPs; and
managing the re-ordering task in single client (or IP) multi-process traffic scenarios, consisting of transactions with different process identifiers ID, that means transactions belonging to different processes or threads, and coming from the same client or initiator, by ensuring either order among the ones with the same identifier ID, or belonging to the same process, so called ID-based order, or order among all the response transactions, regardless of the ID (full in-order traffic).

With a view to achieving the aforesaid provisions, one embodiment is a communication system having the characteristics specified in Claim 1. The embodiment also regards a corresponding integrated circuit and a corresponding method. Further advantageous characteristics of the embodiments form the subject of the dependent claims.

The claims form an integral part of the technical teaching provided herein in relation to the embodiments.

Various embodiments described herein refer to solutions that enable performing transactions re-ordering at the initiator IP response side, by managing response transactions to rebuild same order of request ones, also managing the re-ordering task in single client or IP multi-process traffic scenarios, consisting of transactions with different process identifiers and coming from the same client or IP, by ensuring either order among the ones with same identifier ID, so belonging to the same process, so called ID-based order, or order among all the response transactions, regardless of the ID (full in-order traffic).

According to the solution described herein, the system comprises a single component able to manage re-ordering process in a multi-client context (multi IPs or multi hardware pipelines), by exposing a number N of client interfaces on input, with N>1, and a single output interface compatible with the interconnect protocol.

In various embodiments, the system comprises having a single component able to manage re-ordering process in a multi-process context (single IP able to generate multiple processes identified by specific protocol identifiers (ID for AMBA-AXI, SRC for ST-STBus).

In various embodiments, the system comprises a single and programmable component able to manage conversion between different order policies.

In various embodiments, the system comprises sharing a single memory among different clients (multi-client case) or processes (multi-process case).

In various embodiments, the system comprises providing a multiple buffers view to the re-ordering logic, through memory abstraction enforced by a programmable memory mapping controller component. In the context of the embodiments, memory abstraction is intended as the capability to handle a single physical memory unit as a set of memory buffers of programmable sizes, capability provided by the Memory Map Controller component.

In various embodiments, the system comprises associating each buffer to a client (multi-client case) or to a process (multi-process case).

In various embodiments, the system comprises associating to each request transaction from a client or process a correspondent memory address offset (displacement) in the client or process buffer, where the response data will be stored.

In various embodiments, the system comprises updating a memory address offset of client or process buffer each time a request transaction is generated for that client or process.

In various embodiments, the system comprises storing the offset associated to each request transaction in the tracking memory use to link request and response paths.

In various embodiments, the system comprises recovering an offset associated to a response transaction from the tracking memory.

In various embodiments, the system comprises combining an offset with a base address of a memory buffer associated to a client or process in order to write response data in the proper memory location.

In various embodiments, the system comprises reading sequentially each buffer in order to provide valid data received on response and respecting order requirements to each associated client or process.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The embodiments will now be described purely by way of a non-limiting example with reference to the annexed drawings, in which:

FIGS. 3 to 11 show various details of a system for the management of out of order traffic in an interconnect network according to the present description; and particularly:

FIG. 3 shows a system in a multi-client case, which includes a re-ordering component;

FIG. 4 shows a request path block diagram of a re-ordering component embodiment;

FIG. 5 shows a block diagram of an offset address computation portion of a memory map controller embodiment;

FIG. 6 illustrates a response side of a multi-client embodiment;

FIG. 7 illustrates memory map controller read generation logic in a multi-client embodiment;

FIG. 8 shows exemplary digital logic embedded into memory map controller embodiment;

FIG. 9 shows exemplary response path processing regarding a single client with multi-process (multi-ID) transactions;

FIG. 10 shows memory map controller read generation logic in another multi-client embodiment;

FIG. 11 shows a flow diagram illustrating an embodiment of a method to manage out-of-order traffic in an exemplary interconnect network.

DETAILED DESCRIPTION

The ensuing description illustrates various specific details aimed at an in-depth understanding of the embodiments. The embodiments may be implemented without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Likewise, phrases such as "in an embodiment" or "in one embodiment", that may be present in various points of the present description, do not necessarily refer to the one and the same embodiment. Furthermore, particular conformations, structures, or characteristics can be combined appropriately in one or more embodiments.

The references used herein are intended merely for convenience and hence do not define the sphere of protection or the scope of the embodiments.

As mentioned previously, the disclosure provides a system for the management of out-of-order traffic in an interconnect network communication system.

The proposed solution relies on the abstraction of the shared physical memory, to perform response re-ordering, into a set of logical circular buffers, each one associated to a client or a process, according to the context in which it is used. In others words the proposed solution provides mapping said physical memory on a set of logical circular buffers.

Single memory to multiple buffers abstraction is managed by a digital logic component, in the following called memory map controller, which implements two main different functionalities, one on request transaction path and the other on response transaction path.

On request side, the memory map controller computes the current offset address of each buffer, offset that identifies the first free location in the buffer, in order to provide to the processed request transaction the offset address information from which the correspondent response transactions are preferably stored in the associated buffer.

Figure 1:
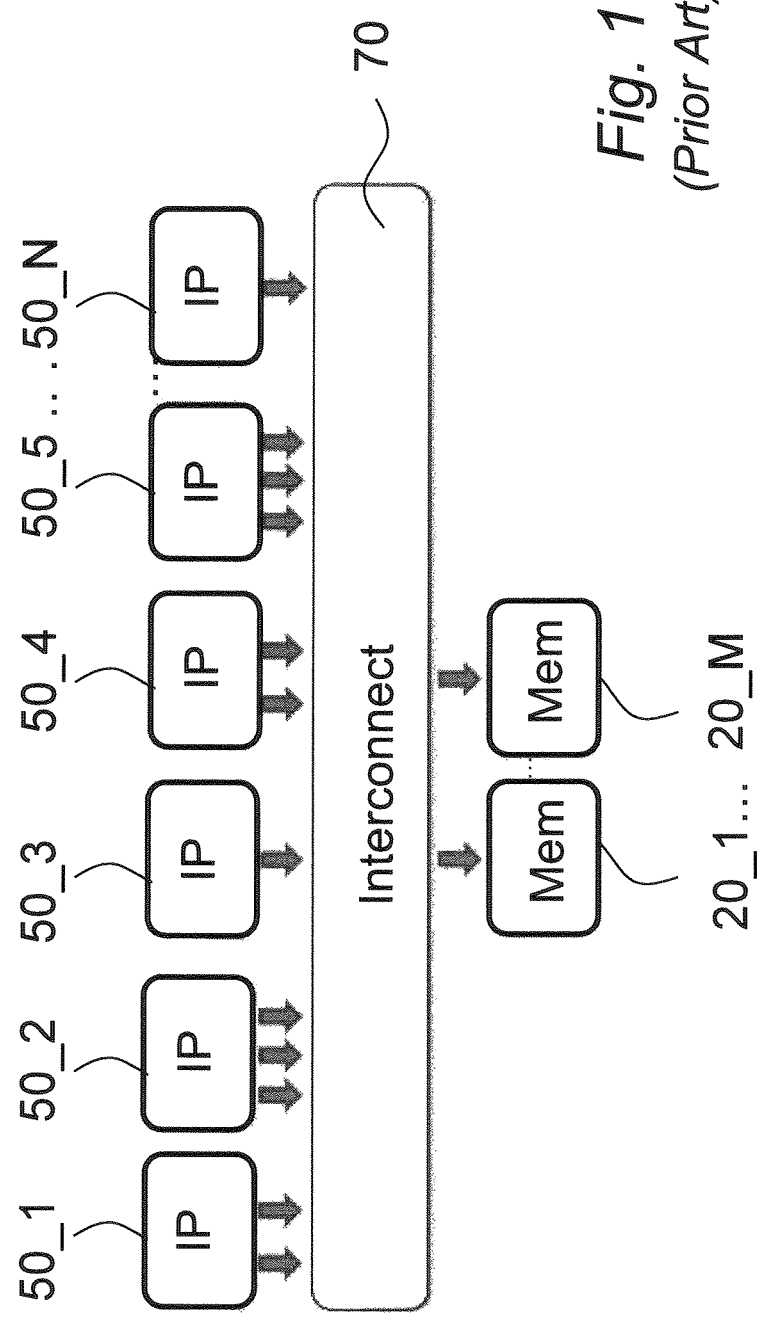
FIG. 1 is a conventional System on Chip (SoC) having a plurality of intellectual property (IP) circuit blocks.
Figure 2A:
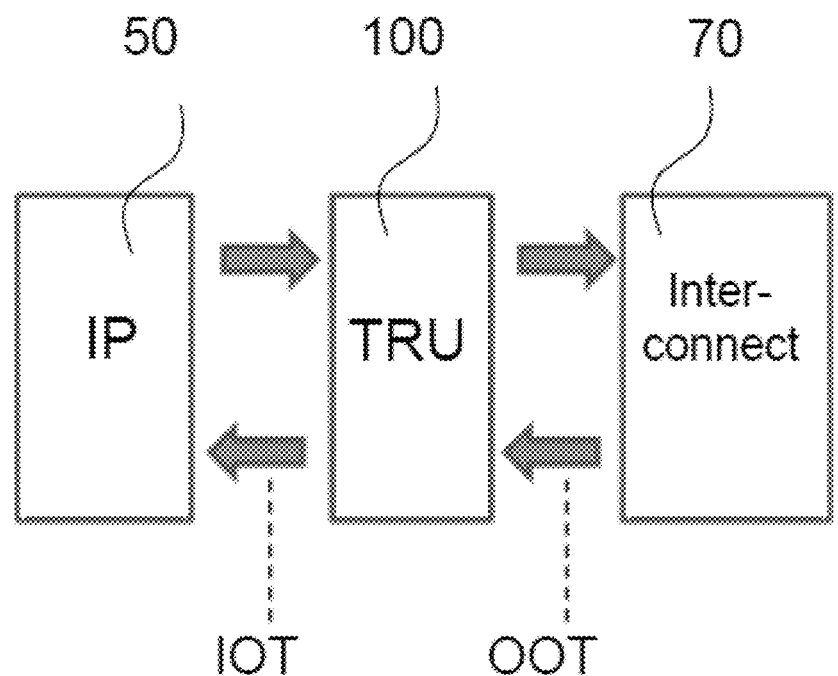
FIG. 2A shows a conventional client initiator communicates with an interconnect through a Transaction Reordering Unit (TRU)
Figure 2B:
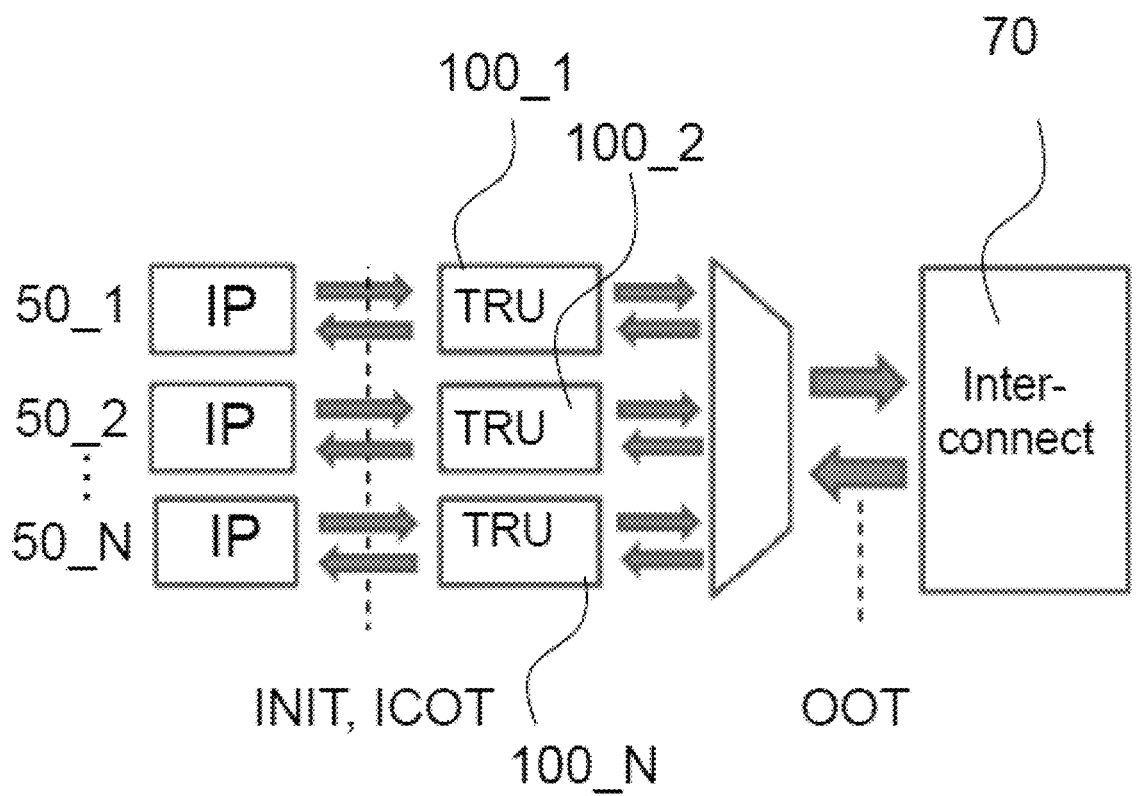
FIG. 2B shows a plurality of conventional initiators communicating out of order traffic (OOT) with an interconnect through a plurality of TRU modules.
Figure 3:
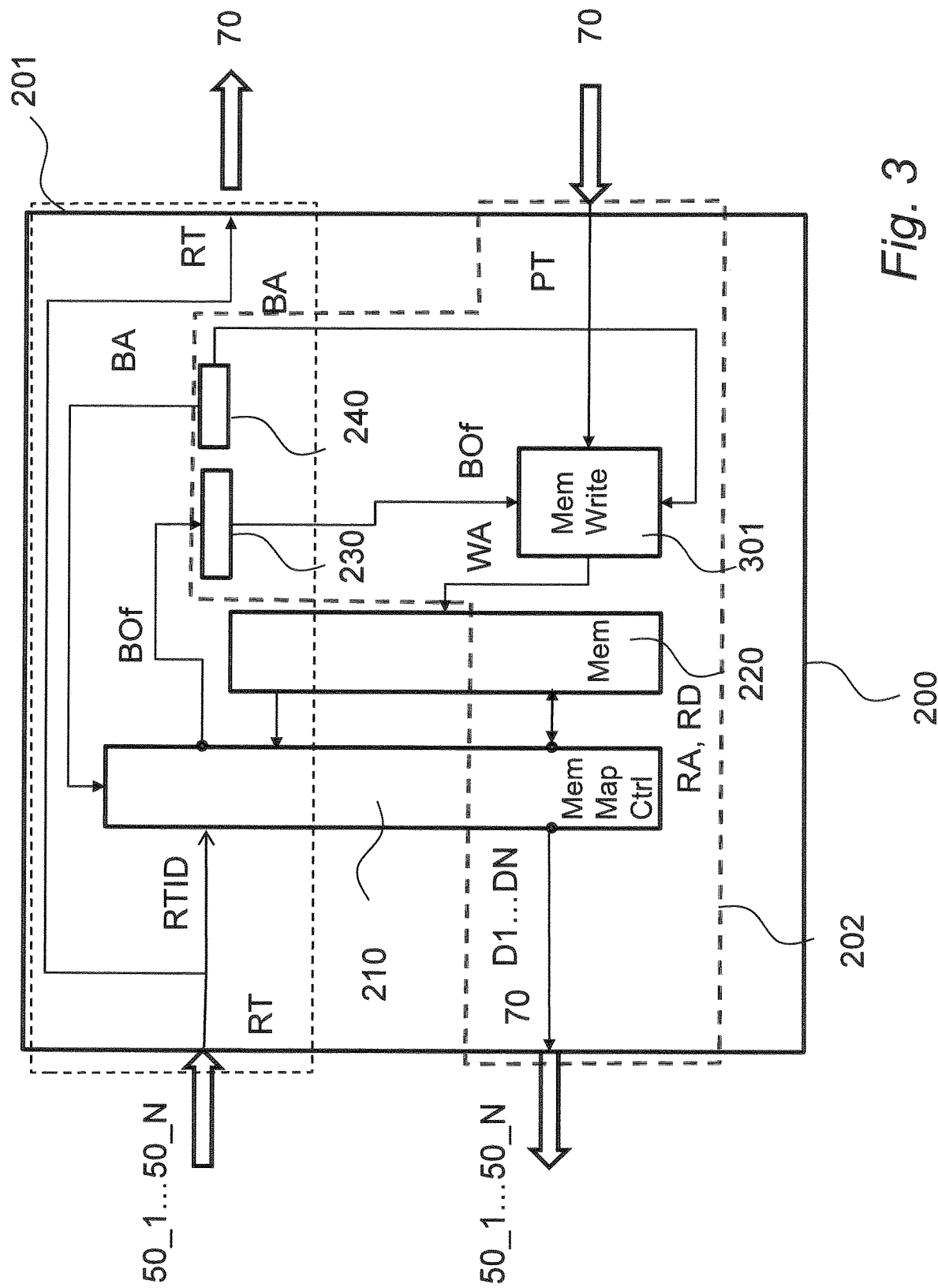

In FIG. 3 it is shown a system in a multi-client case, which includes a re-ordering component 200 receiving requests RT from the plurality of initiators, in particular clients, 50_1 . . . 50 . . . N and responses PT through the interconnect network 70.

Thus the re-ordering component 200 represents a module operating at the initiator side, upstream of the interconnect network 70 with respect to the requests flow.

Such re-ordering component 200 includes, operating both on a request path 201 and on a response path 202 a response re-ordering memory 220 for storing the responses PT and to manage offset addresses BOF associated to requests RT based on their request identification RTID, these tasks being both managed by a memory map controller 210. As mentioned, the memory 220 is a shared physical memory, used to perform response re-ordering, which is managed as a set of logical circular buffers (indicated with B1 . . . BN in FIG. 4), each one associated to a client or a process 50_1 . . . 50-N, according to the context in which it is used, by the memory map controller 210.

The memory map controller 210, which receives a buffer address BA, the buffer base address, from program registers 240, on the request path outputs the current offset address of each buffer BOf, which is stored in a tracking memory 230. On the response path, a memory writing stage 301 computes a write absolute address WA of the memory location where incoming data of the response transaction PT are preferably stored in the response re-ordering memory 220, according to the information coming from the response transaction PT and the offset BOF recovered from the tracking memory 230, together with the buffer address BA. The memory map controller 210 also identifies a response memory reading stage 302 (FIG. 6), generating the proper accesses, by providing read addresses RA and obtaining read data RD to and from the response re-ordering memory 220, in order to provide required response data, D1 . . . DN to the different clients 50_1 . . . 50_N, connected to the component 200, respecting a programmed order policy.

Figure 4:
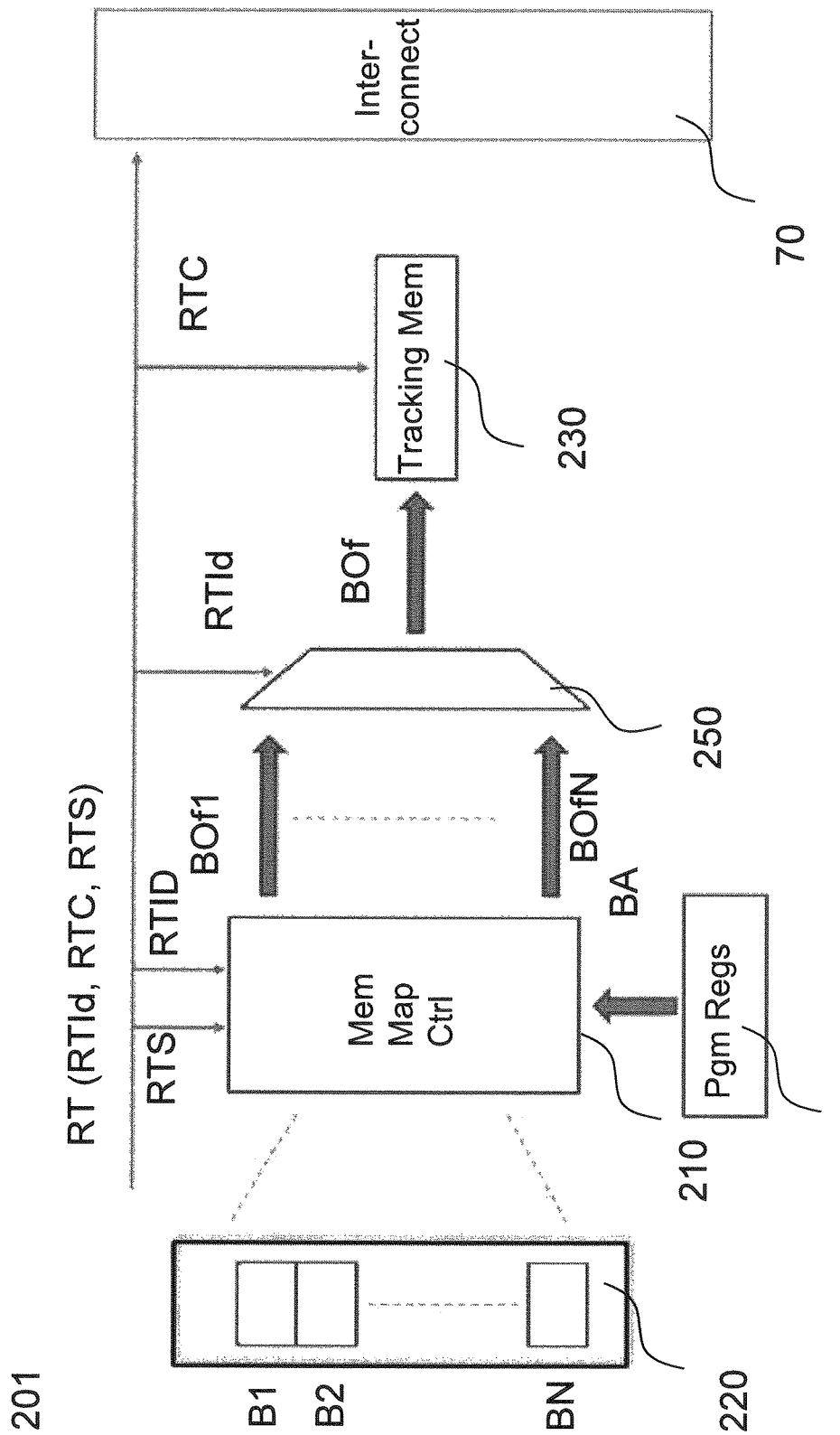

In FIG. 4 it is shown in a detailed manner the request path block diagram of the re-ordering component 200 according to an embodiment. With the numerical reference 220 it is indicated the re-ordering memory, shown as comprising a plurality of circular buffers B1 . . . BN for storing the requests from a plurality of clients 50_1 . . . 50_N. As mentioned, this view is a memory abstraction enforced by the programmable memory mapping controller, i.e., memory map controller 210. The re-ordering component 200 includes in the request path such memory map controller 210, which is configured for providing on output offset addresses, Bof1, . . . , BofN, corresponding to each client buffer B1 . . . BN of a given client or IP 50_1 . . . 50_N, under the control of a buffer address BA, giving the buffer location BA, contained in program registers 240 associated to the memory map controller 210. To the re-ordering component 200 it is fed the transaction request RT which signal includes transaction information, comprising a transaction identification, RTID and transaction controls RTC, which comprise the handshake signals, transaction sizes and other typical signals of the interconnect protocol the component is interfacing. In the transaction identification RTID it is coded the indication of the client, among the plurality of clients 50_1 . . . 50_N, to which the current request transaction RT belongs and it is used to drive a multiplexer logic 250 that selects only one of such of offset addresses, Bof1 . . . BofN according to the value of such Transaction identification, RTID, as selected buffer offset address BOf.

The selected buffer offset address BOf is then stored in the tracking memory 230, in the location reserved to the current request transaction, in order to be used as soon as the correspondent response transaction will come back.

The choice to use offset addresses of buffers memory locations instead of absolute memory addresses allows reducing the storage requirements in the tracking memory 230: for example, assuming 1 kBytes of shared re-ordering memory 220 (10 bits addressing space), 8 clients and logical buffers with size of up to 128 bytes (7 bits), storing offset addresses instead of absolute addresses means a 3-bits saving for each address stored in the tracking memory 230; supposing a tracking memory 128 locations capable, this means a saving of 128*3=384 bits (Flip-Flops).

Each time a request transaction RT is granted by the interconnect network 70, with its own offset address stored in the tracking memory 230 block, the memory map controller 210 updates the offset address BOf for the client buffer to which the transaction belongs, by updating the current offset value BOF adding the equivalent size in terms of buffer locations of the granted transaction, i.e., the request transaction size RTS. This new computed offset will be associated to the next request transaction of the same client (or process).

Figure 5:
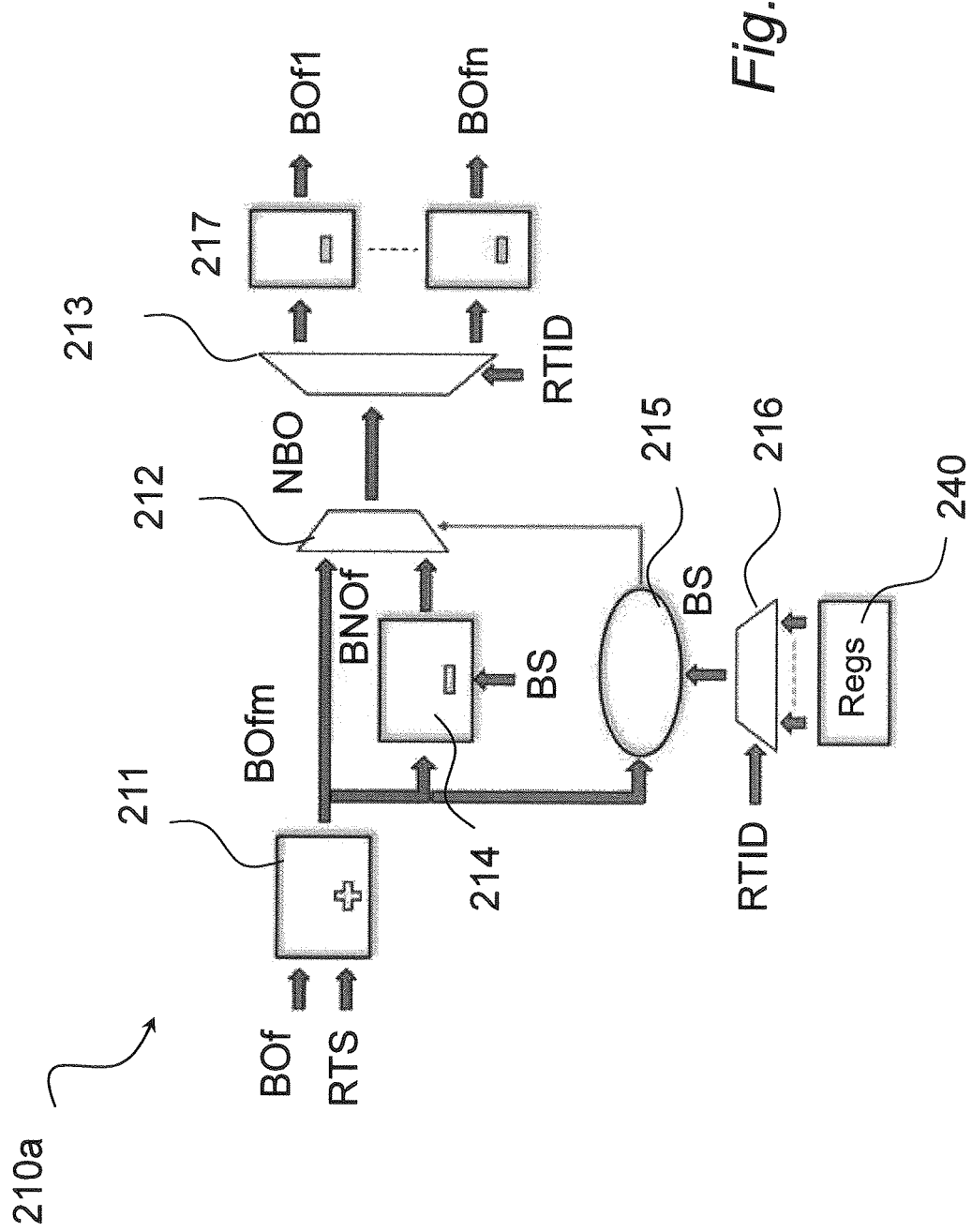

This can be better understood with reference to FIG. 5, in which it is shown a block diagram of an offset address computation portion 210a of the memory map controller 210 that performs offset address computation; this logic is common among all clients or processes, exploiting the fact that only one transaction at the time is processed.

A first computation stage consists of an offset update block 211 that adds together current transaction offset BOf with transaction size RTS, where, as mentioned previously, the latter is the number of equivalent re-ordering memory locations the correspondent response transaction RT needs to store the data. An intermediate offset value BOfm is obtained, which is compared with a client buffer size BS, by an offset comparison block 215, in order to detect if an overflow of the corresponding circular buffer is occurring (i.e., if the offset value BOfm is bigger than buffer size BS), and to be able to selectively enable the proper value to use.

An offset correction block 214 performs the normalization, calculating a normalized offset value BNOf of intermediate offset BOfm by subtracting the buffer size BS from the intermediate offset BOfm value, to provide the offset re-circulation when buffer overflow occurs.

Both offset comparison 215 and offset correction 214 blocks rely on the client buffer size BS information provided by the programmable registers 240, through a multiplexer 216 driven by transaction identification TID, according to the fact that client or process buffer allocation used by the memory map controller 210 can be programmed by the user.

A multiplexer 212, driven by the results of the offset comparison 215, selects a computed offset NBO between intermediate offset BOfm (if there no overflow of the circular buffer is detected) and the normalized value BNOf, which is then routed by a demultiplexer 213 to a plurality of proper buffer offset registers 217 according to the transaction identifier RTid, which defines the buffer B1 . . . Bn to which the request transaction RT is associated.

Now, the response side of the system according to an embodiment will be described with reference to FIG. 6. On the response side the re-ordering module 200 performs two main tasks that combined together allow supporting the conversion from an out-of-order response transactions traffic to a client-based or process-based ordered scheme: absolute memory address computation and order-controlled parallel buffers read.

Figure 6:
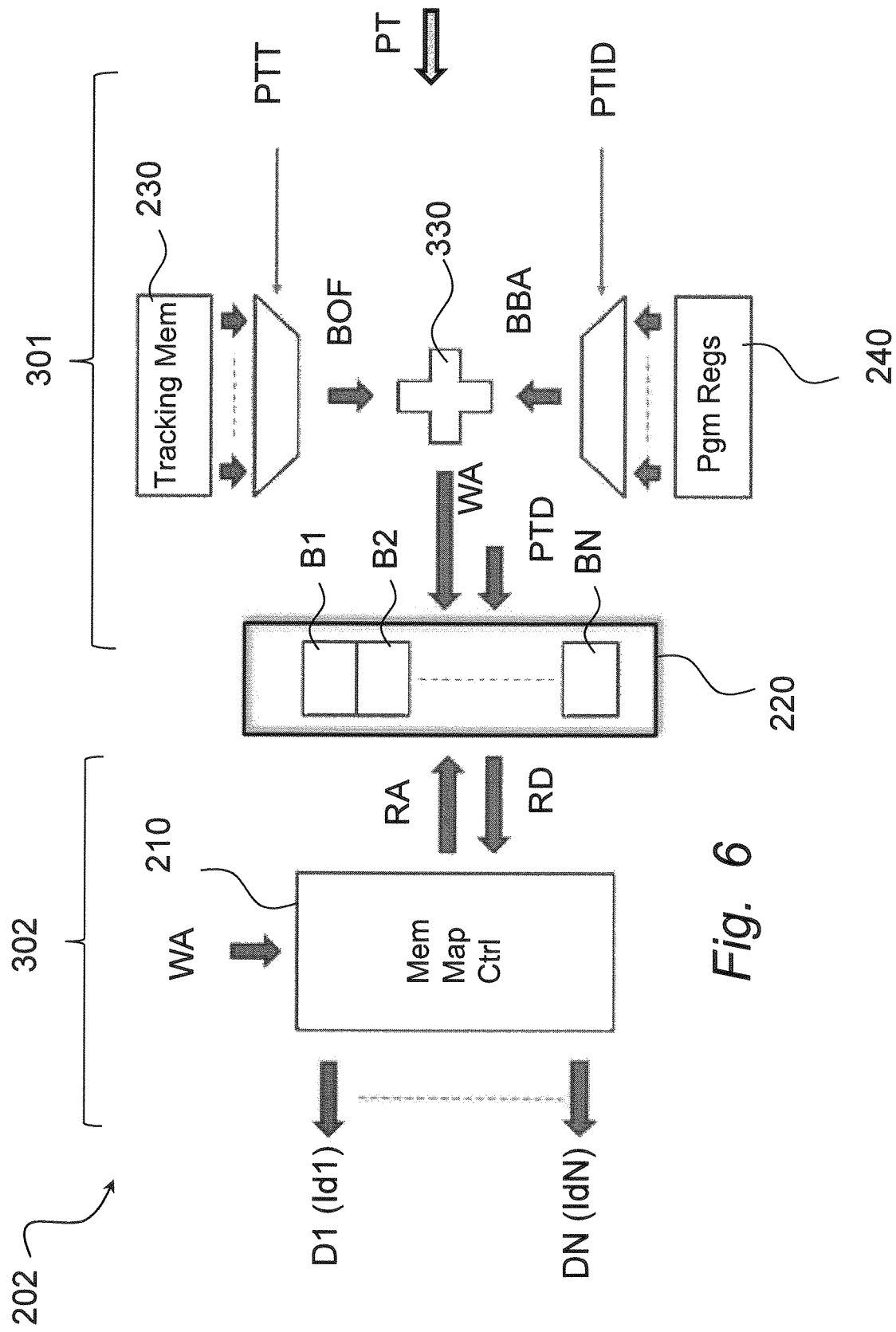

As shown in FIG. 6, which represents the response side in a multi-client case, it is provided a response re-ordering memory 220 with dual port capability (one read, one write) that allows improved performances with respect to a single port memory. Embodiments can be however applied to different memory architecture choices, not described here. The response re-ordering memory 220 contains a plurality of buffers B1 . . . Bn.

Thus, when a response transaction PT is received from the interconnect network 70, the internal tracking memory 230 is accessed in order to recover the information stored on request side, when the correspondent request transaction RT was sent, including the transaction buffer offset BOf.

The buffer offset BOf is added in an adder 330 to a buffer base address BBA to compute a write absolute address BA of the memory location where the response transaction data PTD are preferably stored in the response re-ordering memory 220; the buffer base address BBA is recovered, from the programmable registers 240, using a response transaction identifier PTID.

Therefore, the response path for a multi-client application shown in FIG. 6 includes a first stage 301 (blocks 230, 240, 330) that computes the write absolute address WA of the memory location where the incoming data, i.e., the transaction response Data TRD, are preferably stored in the response re-ordering memory 220, according to the information coming from the response transaction RP and recovered from the tracking memory 230.

In this embodiment, the recovery of the offset address from the tracking memory 230 is performed through an index-based approach by using the response transaction tag PTT as in the prior art TRU unit solution described above, received back with the response transaction PT, to select the location of the tracking memory 230 where the correspondent offset BOf has been stored; this is a possible implementation option, although another reordering component can have different implementations of the way of accessing the tracking memory 230 to retrieve control information (for example, through location search according to response transaction ID information, as in CAM or Linked List based memories). Such index based approach applied in the prior art TRU solution operates for instance by transmitting in the request the position in the tracking memory where such information are stored for a given request and operating on the assumption that the interconnect protocol represents such position information (index, typically called tag) in the response, so that it can be used to retrieve desired information stored in the tracking memory, at the position specified by the tag.

This first stage 301 on response side takes care of writing the incoming response data in the proper location of the re-ordering memory 220, whatever is the order of responses received from interconnect network 70: the buffer offset information BOf, computed and stored during request elaboration, recovered on response and combined with buffer base address BBA, carries itself the order positional property required on client side.

In the multi-client context of FIG. 6, a second stage 302 of the response path 300 is responsible to generate the proper accesses to the memory in order to provide required response data to the different clients connected to the component, respecting a programmed order policy (inter-client out-of-order responses and intra-client in order responses, or full in-order responses); this task is again performed by the aforementioned digital block memory map controller 210, that provides the abstraction of the memory 220 as a set of programmable buffers B1 . . . BN.

For each data response PTD written into the re-ordering memory 220, the memory map controller 210 receives the write absolute address WA of the memory location where the data PTD is written. This is in particular received at a memory map controller read generation logic 210b in the multi-client case, shown in FIG. 7, which includes a valid data flags register 312.

The write absolute address WA is required to update the valid data flags register 312, which is a flip-flop based memory consisting of one bit for each memory location, that is used to track which data have been received and stored in the re-ordering memory 220 (valid memory locations). The update process means writing to '1' the correspondent location identified by the memory write address WA operating through a multiplexer 311 driven by said write Address WA.

As for the data memory, memory map controller 210 manages such valid data flags register 312 in a number of smaller parts, FB1 . . . FBN, equal to the number N of clients 50, each one sized according to the programmed size of the correspondent memory client buffer.

For each of these portions of the valid data flags register 312, a read digital logic stage 313 is associated in order to read sequentially the status of the valid flags belonging to that client: this logic stage 313 comprises a selector (multiplexer) 313a, driven by all the data flags associated to a given portion FB1, a read pointer, indicated with RP1 to RPN according to the respective portion FB1 . . . FBN, that controls the selector 313a access to the flags, and an update block 313b required to update the read pointer RP1 . . . RPN under the control of an arbitration logic 314.

The purpose of such arbitration logic 314 is to read a determined portion FB of the flag register 312 sequentially with recirculation, checking the flag value of the location pointed by the Read Pointer RP: if its value is '1', meaning the correspondent memory buffer location has been filled with data, a read request RQ, corresponding to the winner request, to the memory can be issued by the arbitration logic 314 for that client, because expected data in terms of order is available in the buffer. This is obtained, selecting through the read request RQ signal supplied to the selecting input of a multiplexer 316, among the read pointers RP1 . . . RPN the related read address RA, also indicated in FIG. 6. Also, the arbitration logic 314, once the read data RD are corresponding to the read address RA are retrieved by the memory 220 drives, through the request signal a multiplexer 315 to output on the correct data channel D1 . . . DN corresponding to the identifier ID1 . . . IDN of the client 50_1 . . . 50_N originating the request, i.e., the request transaction identifier.

The capability provided by the memory map controller 210 to have multiple read logic stages 313 able to access in parallel the valid data flags register 312 (one read logic stage for each client), that is fundamental to support inter-client out-of-order response transactions propagation, can generate multiple read access requests to the memory 220 (even one read request from each client read logic stage 313): this requires the instantiation of the arbitration logic stage 314 to control the access to the shared read port of the re-ordering memory 220; any arbitration algorithm among requests can be used, it has no implication on re-ordering purpose of the system disclosed, and can be selected in order to improve performances in the application scenario in which the solution is used.

As soon as the arbitration logic 314 selects the winner request, RQ, the correspondent Buffer Read Pointer RP is selected by the multiplexer 316 and sent to the memory read port as memory read address RA, because it is the address of the memory location where the expected data is; in parallel, a new value for this read pointer RP is computed, and updated through the update block 313b, in order to point to the following flag bit in the portion FB of the valid data flags register 312 dedicated to the granted client.

Figure 7:
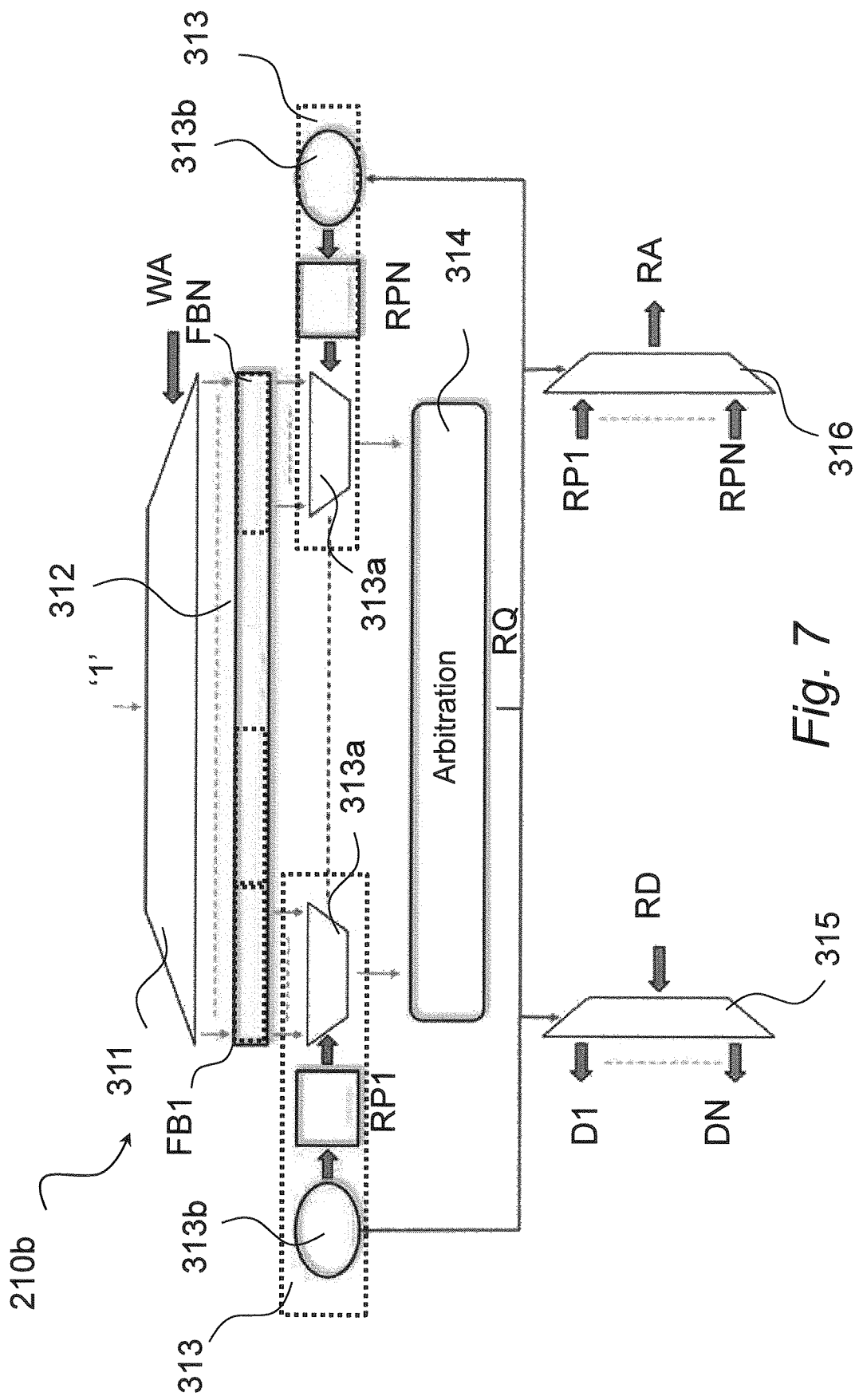

As mentioned above, the arbitration result is also used to route, through a selector represented by a multiplexer 315, read data RD coming from the memory 220 to the proper granted client 50, corresponding to the proper identifier ID, as a consequence of read access request: in the embodiment of FIGS. 6 and 7 it has been assumed no latency on memory access, i.e., the read data RD is available in the same cycle of memory read address RA. However, the proposed solution can be applied also to embodiments with memory latencies different from zero, by properly retiming the arbitration logic 314 output driving the data router, i.e., the multiplexer 315.

Figure 8:
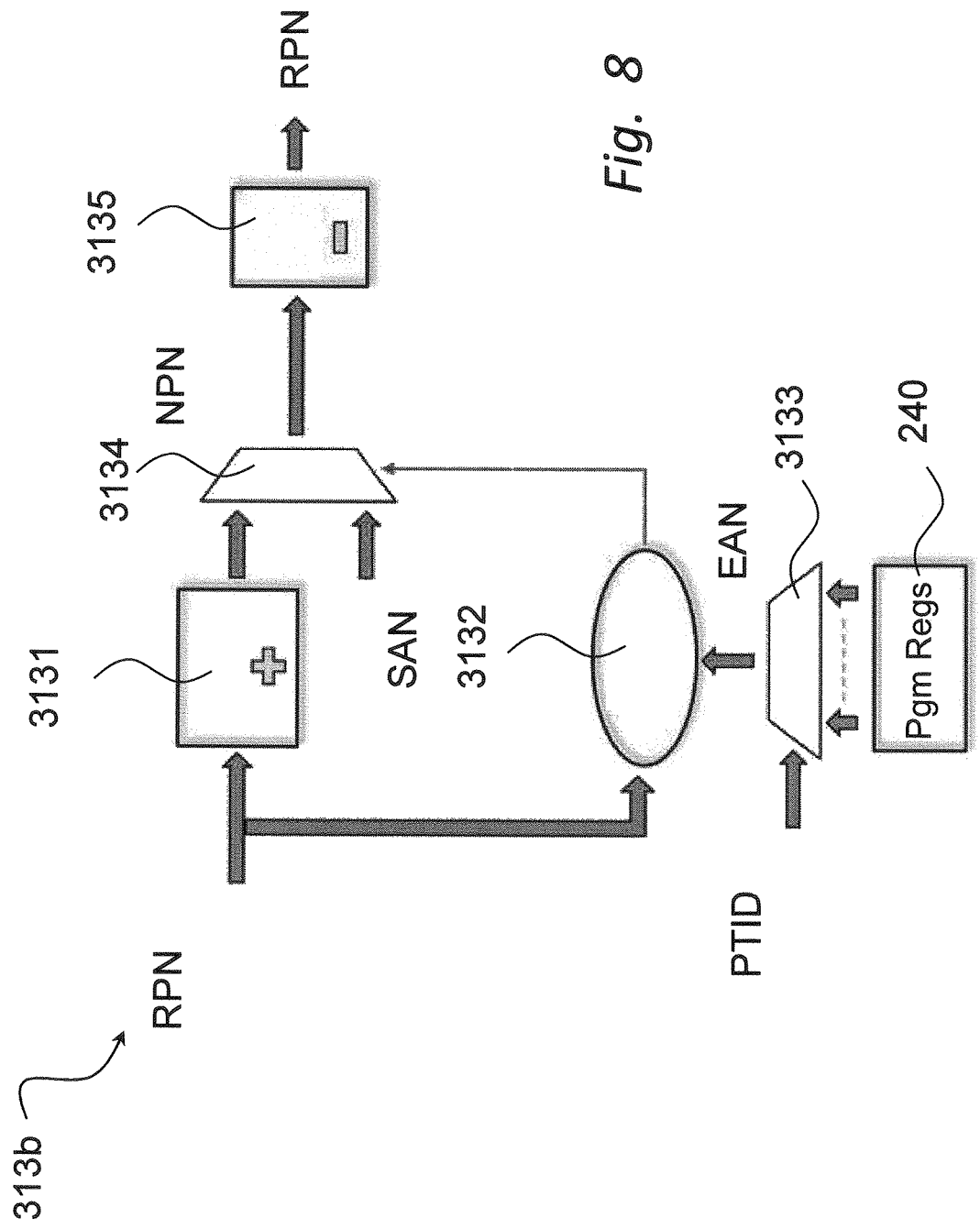

In FIG. 8 it is shown the digital logic 313b embedded into memory map controller 210 and dedicated to the update of each buffer read pointer RP1 . . . RPN: as already mentioned, the read Pointer, for instance the Nth pointer RPN is incremented, by a pointer increment block 3131, in particular an adder block, each time a read request on its memory buffer is granted, to enforce sequential scan of buffer location (and so order of client responses), unless it has reached a buffer end address EAN; in this case, detected by a read pointer check logic 3132, for instance a comparator, the read pointer RPN will be put equal to a buffer start address SAN, thus ensuring recirculation within the re-ordering memory 220 buffer without overflow (as for the buffer offset BOf on the request path); the buffer start/end Addresses SAN, EAN are provided by the programming registers 240, through a selector 3133 driven by the response identifier PTID.

This solution applied to multi-client context allows converting response transaction traffic received fully out-of-order from the interconnect network into a client-based re-ordered traffic (transactions ordered for each client, out-of-order among clients).

Figure 9:
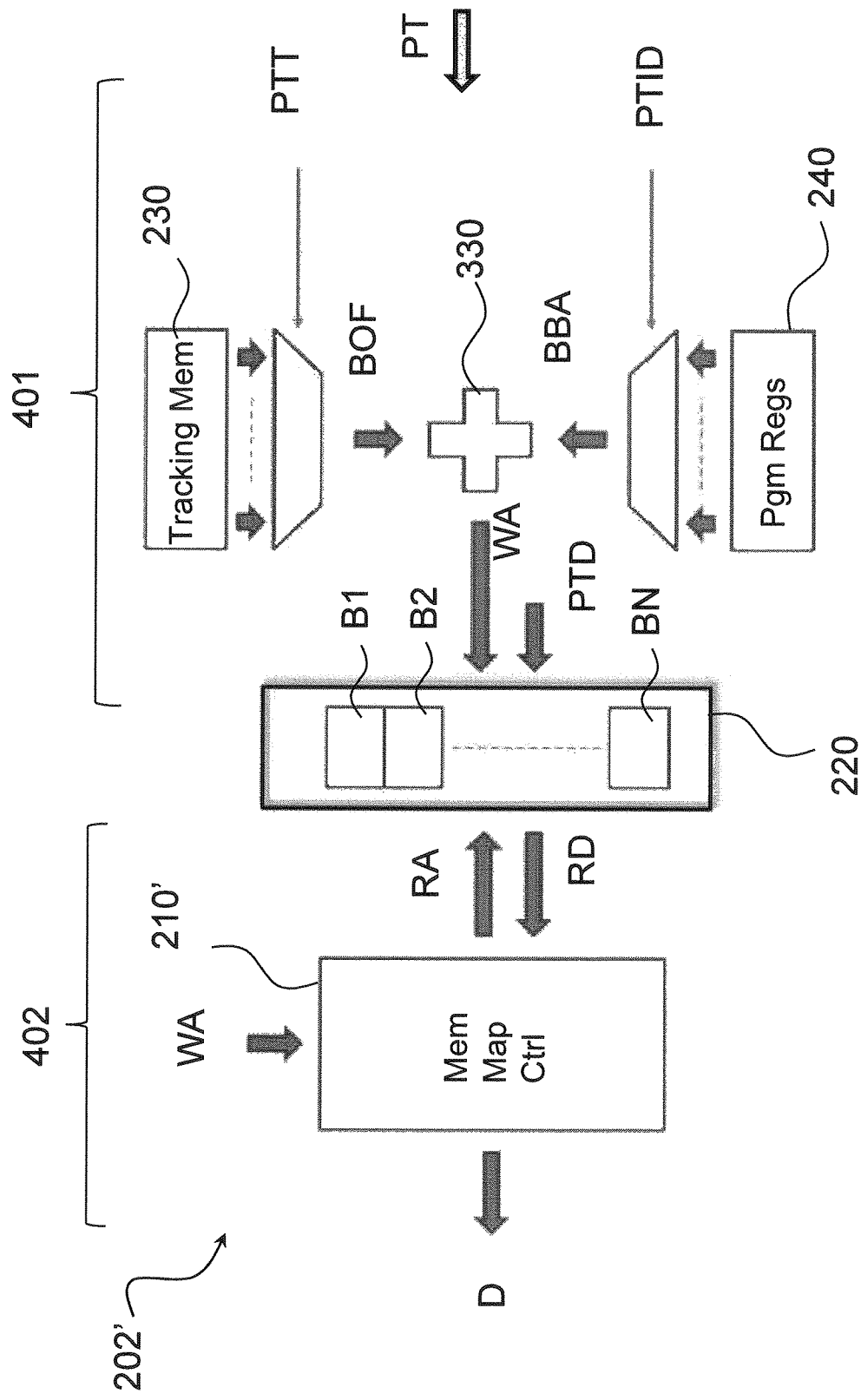
Figure 10:
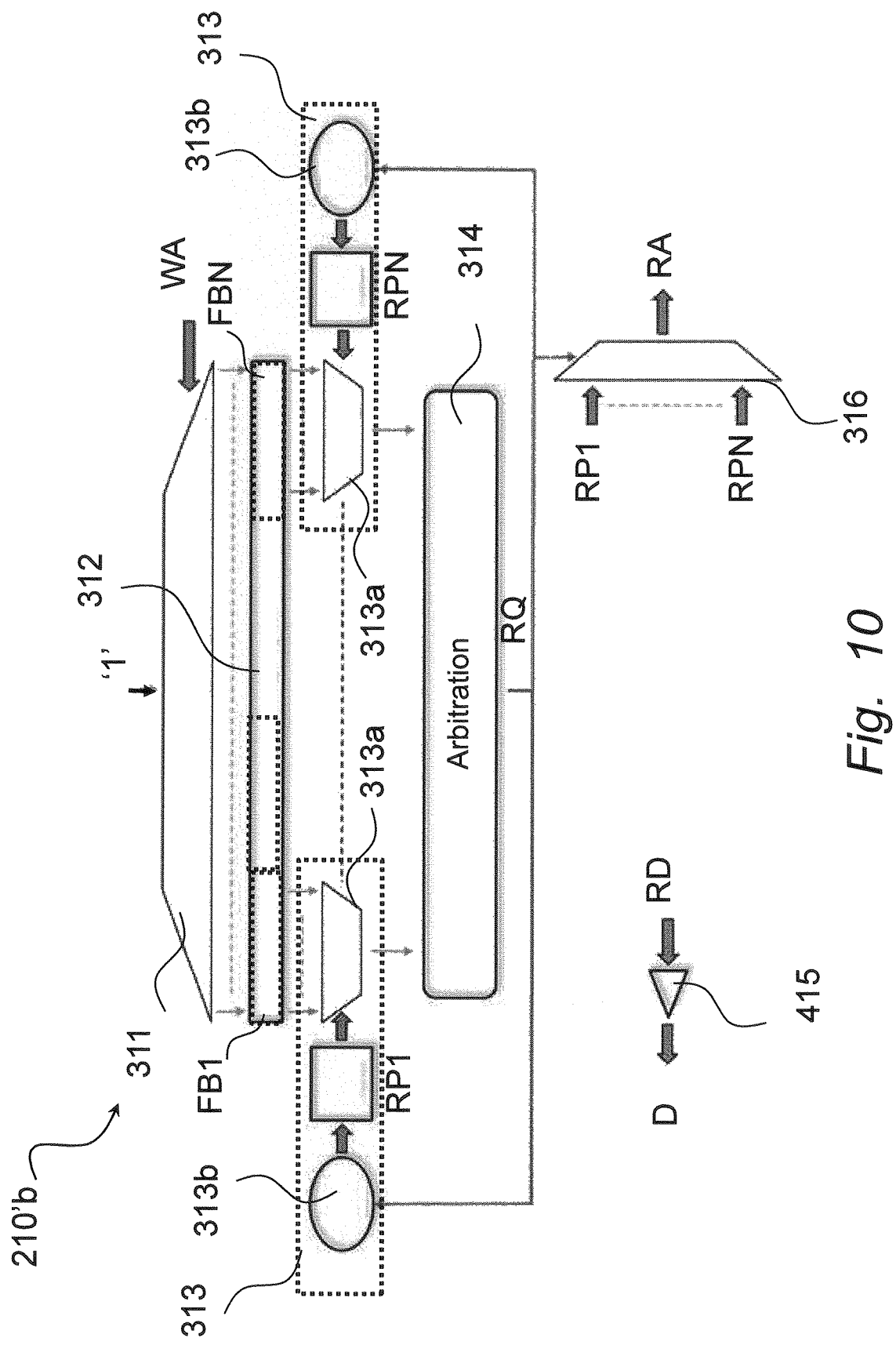

With reference to FIGS. 9 and 10 it is described the embodiment of the response path regarding the case of a single client with multi-process (multi-ID) transactions. As it can be seen, the response path is still based on the two stages approach: a first stage 401 pertaining the response memory writing is like the first multi-client case of FIG. 6 and consists in the computation of absolute memory address WA, starting from buffer offset BOf address recovered from tracking memory 230 and buffer base address BBA from programming registers 240.

For what concerns the second stage 402, pertaining the response memory reading), it is still managed by the memory map controller 210 component that in this case needs to provide ID-based transaction re-ordering (transactions with same ID to be re-ordered, transactions with different IDs can be propagated out-of-order) to a single client.

As in the multi-client embodiment, the memory map controller 210 handles the valid data flags register 312, shown in FIG. 9 bit writing, according to the memory write Address WA computed by the first stage 401, and bit reading, through the read logic stages 313, that in the multi-process embodiment are associated each one to a specific process identifier ID, as it is also for the memory buffers.

Each of these stages 313 raises a read request if the correspondent expected data is available in the re-ordering memory 220, the arbitration logic 314 still selects the winner process that will have the access to the memory and routes the correspondent buffer read pointer RP to the memory read port, in order to retrieve the stored data.

With multi-process single client context, response datapath is simpler because data, indicated with D in FIGS. 9 and 10, received from the re-ordering memory 220 needs simply to be routed, through a buffer 415, to the single client 50 connected to the component 200; no selection among different clients is required.

Based on the above description, in FIG. 11 it is shown a flow diagram illustrating an embodiment 500 of a method for the management of out-of-order traffic in the interconnect network 70, comprising exchanging requests RT from initiators 50_1, . . . , 50_N and responses RP from targets 20_1 . . . 20_M through said interconnect network 70, comprising performing 100, 200 upstream the interconnect network 70, a response re-ordering operation, using the re-ordering component 200.

The method comprises the following operations:
- block 510 indicates the operation of providing, by the memory map controller 210, a management of the re-ordering memory 200 as a set of logical circular buffers B1 . . . BN, each one associated to a client or a process, i.e., initiators, 50_1 . . . 50-N;
- block 520 indicates an operation of computing the offset address BOf1 . . . BOfN for each of the logical circular buffers B1 . . . BN, each corresponding to one of the initiators. During this operation it is identified the first free location in the buffer, in order to provide to the processed request transaction RT the offset address information from which the correspondent response transactions PT are preferably stored in the associated buffer;
- block 530 indicates an operation of storing the offset address BOf of a given request RT received on the request path 201, in particular in the tracking memory 230, Operations 510, 520 are done on request side (from initiators to interconnect) and are the first operations executed, as soon as a request RT is received by the memory map controller 210;
- with 540 is indicated an operation of storing responses PT, coming from the interconnect network 70 in the re-ordering memory 220, computing an absolute write memory address WA for writing responses PT in said memory 220 corresponding to said given request RT on the basis of said stored given request offset address BOf;
- block 550 indicates an operation of performing an order-controlled parallel read of said logical circular buffers B1 . . . BN, in particular through generation in the memory map controller 210 of one or more read requests RQ corresponding to responses PT and of respective read addresses RA;

block 560 indicates an operation of performing a routing, in particular providing the required response data, D1 . . . DN to the different clients 50_1 . . . 50_N, of the data RD read from said memory 220 to the corresponding client or initiator 50_1 . . . 50_N.

The solution according to embodiments allows to obtain the following advantages.

The method according to the embodiments is advantageous in terms of functionality since the programmable component is able to manage several traffic re-ordering conversions and the method is well suited for multi-client or single client multi-process architectures.

The method according to the embodiments is advantageous in terms of performance and Quality of Service attained, since the round-trip latency is improved thanks to ID-based re-ordering support that removes dependencies among slow and fast processes. Also, to this regard, the bandwidth requirements are easier to match and there is an increased utilization of interconnect network.

The method according to the embodiments is advantageous in terms of costs since there are savings in silicon area and routing thanks to single component with shared re-ordering memory and control memory among processes or clients. The wire congestion is reduced accordingly, allowing easier backend chip integration, thanks to less routing resources requirements The method according to the embodiments is advantageous in terms of programmability since the shared memory is allocated among clients/processes controlled by programmable registers, allowing on-silicon tuning according to functional scenarios and real time needs. Also there is a programmable order conversion.

The method according to the embodiments is advantageous in terms of compatibility since there is a full support of STBus/AXI transactions ordering models, without limitations.

The method according to the embodiments is advantageous in terms of portability, since it is applicable to whatever advanced interconnect protocol, thanks to protocol independent internal core.

Of course, without prejudice to the principle of the invention, the details of construction and the embodiments may vary widely with respect to what has been described and illustrated herein purely by way of example, without thereby departing from the scope of the present invention, as defined the ensuing claims.

The re-ordering component according to the embodiments can be for instance comprised in an integrated circuit, in particular System-on-Chip or SoC and system in a sole package (System-in-Package or SiP). The integrated circuit can include only the re-ordering component in a stand-alone manner, or it may include also one or more initiators, and possibly also other components.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system to manage out-of-order traffic, comprising:
a plurality of initiators configured to provide requests for memory resource targets through an interconnect network, the initiators being further configured to receive responses from the memory resource targets passed through said interconnect network back to said initiators;
one or more components between the initiators and the interconnect network, the one or more components being configured to perform response re-ordering, each of the one or more components including:
a re-ordering memory to store responses coming from said interconnect network;
a memory map controller configured to, in response to receiving a respective request of the requests for one of the memory resource targets, compute a respective offset address identifying a respective logical circular buffer of a set of logical circular buffers in the re-ordering memory, and said memory map controller being configured to store the respective offset address for each of the requests received from the initiators, the logical circular buffers corresponding respectively to absolute memory addresses of the re-ordering memory; and
address computation logic to compute, for each response received, the absolute write memory address corresponding to the logical circular buffer identified by the stored offset address of the request to which the response is responsive to, based on said stored offset address, said absolute write memory address identifying where the response will be stored, wherein said memory map controller is further configured to perform an order-controlled parallel read of said logical circular buffers, store the response in a portion of the re-ordering memory identified by the computed absolute write memory address, and perform a routing of data read from said re-ordering memory to a corresponding initiator.

2. The system according to claim 1, comprising:
selection logic to select among computed offset addresses provided by said memory map controller said stored offset address, said selection logic being under control of a request identification in said request, said request identification indicating which initiator of the one or more initiators the respective request belongs to; and
tracking memory to store said stored offset address.

3. The system according to claim 1, wherein said address computation logic is configured to compute, for each response received, the absolute write memory address by summing said stored offset address with a base address stored in at least one programmable register of said memory map controller.

4. The system according to claim 1, wherein said memory map controller comprises:
read generation logic configured to generate a read address to read said logical circular buffers; and
routing logic to route to the initiators corresponding data read from said re-ordering memory.

5. The system according to claim 4, wherein said read generation logic comprises:
a data flags register configured to track which data have been received and stored in the re-ordering memory, said data flags register being mapped in a plurality of portions equal to how many initiators of the plurality of initiators are provided, each of said plurality of portions being sized according to a programmed correspondent memory client buffer size; and
arbitration logic configured to check values in said data flags register and, based on said values in said data flags register, select a read address and select a route to perform said routing of the corresponding data read from said re-ordering memory to the corresponding initiator.

6. The system according to claim 4, wherein said memory map controller is configured to respectively associate the logical circular buffers with the initiators.

7. The system according to claim 5, wherein said memory map controller is configured to respectively associate the logical circular buffers with processes.

8. The system according to claim 1, wherein each time a request from one of the initiators is granted, said memory map controller is configured, with an offset address of the one of the initiators stored in the tracking memory, to update the stored offset address by adding an equivalent size of buffer locations of the granted request.

9. The system according to claim 1, wherein at least one of the one or more components is formed in a single integrated circuit.

10. A method to manage out-of-order traffic, comprising:
exchanging requests from initiators and responses from targets through said interconnect network;
upstream from the interconnect network, performing a response re-ordering operation, the re-ordering operation including:
managing a re-ordering memory with a memory map controller, the managing including managing a set of logical circular buffers configured in the re-ordering memory, the logical circular buffers being respectively associated with the initiators, and each logical circular buffer corresponding to a respective absolute memory address of the re-ordering memory;
in response to receiving a request from one of the initiators, computing a respective offset address for the logical circular buffer associated with the one of the initiators;
storing the computed offset address in a tracking memory;
receiving from one of the targets a response the request from the one of the initiators;
in response to receiving the response, computing an absolute write memory address corresponding to the logical circular buffer identified by the stored offset address of the request from the one of the initiators;
writing the response in said re-ordering memory, the response corresponding to said given request at a location corresponding to the absolute write memory address computed;
performing an order-controlled parallel read of said logical circular buffers to obtain data corresponding to the response; and
routing the data corresponding to the response from said re-ordering memory to the one of the initiators.

11. The method according to claim 10, comprising: based on a request identification in said request from the one of the initiators, selecting said stored offset address of the request from among computed offset addresses provided by said memory map controller, wherein said request identification indicates which initiator of the one or more initiators the request belongs to.

12. The method according to claim 10, wherein computing the absolute write memory address includes:
summing said stored offset address of the request from the one of the initiators with a base address stored in at least one programmable register of said memory map controller.

13. The method according to claim 11, comprising: updating the stored offset address of the request from the one of the initiators by adding a size equivalent to a size of buffer locations of the request.

14. An interconnect network response re-ordering component, comprising:
a re-ordering memory to store responses passed through an interconnect network;
a memory map controller configured to, in response to receiving a request from an initiator for a memory resource target accessible via the interconnect network, compute and store an offset address of a logical circular buffer of a set of logical circular buffers of the re-ordering memory, each logical circular buffer corresponding to an absolute memory address of the re-ordering memory; and
address computation logic to compute, in response to receiving a response from the memory resource target, the absolute write memory address based on the assigned offset address of the given request, store the response in a memory location identified by said absolute write memory address, wherein said memory map controller is further configured to perform an order-controlled parallel read of said logical circular buffers and to perform a routing of data, corresponding to the response, read from said re-ordering memory to the initiator.

15. The interconnect network response re-ordering component according to claim 14, comprising:
selection logic to select among computed offset addresses provided by the memory map controller based on a request identification in the request, the request identification indicating which initiator of a plurality of initiators the request belongs to; and
tracking memory to store the assigned offset address of the request.

16. The interconnect network response re-ordering component according to claim 14, comprising:
read generation logic configured to generate a read address to read the logical circular buffers; and
routing logic to route to the initiator data read from the re-ordering memory.

17. The interconnect network response re-ordering component according to claim 14, comprising:
a data flags register to track which data have been received and stored in the re-ordering memory; and
arbitration logic to check values in the data flags register and, based on the values in the data flags register, to select a read address and to select a route through the interconnect network back to a corresponding initiator.

18. The interconnect network response re-ordering component according to claim 14, wherein the interconnect network response re-ordering component is formed in an integrated circuit.

* * * * *